(12) United States Patent
Jiang et al.

(10) Patent No.: US 10,739,377 B2
(45) Date of Patent: Aug. 11, 2020

(54) NUMERICALLY CONTROLLED ROTARY PROBE SWITCHING DEVICE BASED ON ENVIRONMENT-CONTROLLABLE ATOMIC FORCE MICROSCOPE

(71) Applicants: Southwest Jiaotong University, Chengdu (CN); Tsinghua University, Beijing (CN)

(72) Inventors: Liang Jiang, Chengdu (CN); Linmao Qian, Chengdu (CN); Jianbin Luo, Beijing (CN); Bin Lin, Chengdu (CN); Yushan Chen, Chengdu (CN)

(73) Assignees: Southwest Jiaotong University, Chengdu (CN); Tsinghua University, Beijing (CN)

( * ) Notice: Subject to any disclaimer, the term of this patent is extended or adjusted under 35 U.S.C. 154(b) by 0 days.

(21) Appl. No.: 16/347,582

(22) PCT Filed: Jan. 11, 2019

(86) PCT No.: PCT/CN2019/071252
§ 371 (c)(1),
(2) Date: May 5, 2019

(87) PCT Pub. No.: WO2019/200983
PCT Pub. Date: Oct. 24, 2019

(65) Prior Publication Data
US 2020/0096539 A1   Mar. 26, 2020

(30) Foreign Application Priority Data

Apr. 16, 2018   (CN) .......................... 2018 1 0338397
Jun. 20, 2018   (CN) .......................... 2018 1 0637066

(51) Int. Cl.
*G01Q 60/02* (2010.01)
*G01Q 70/02* (2010.01)

(52) U.S. Cl.
CPC ............. *G01Q 60/02* (2013.01); *G01Q 70/02* (2013.01)

(58) Field of Classification Search
CPC ............................... G01Q 60/02; G01Q 70/02
See application file for complete search history.

(56) References Cited

FOREIGN PATENT DOCUMENTS

| CN | 102360028 A | 2/2012 |
|---|---|---|
| CN | 103529245 A | 1/2014 |

(Continued)

*Primary Examiner* — Nicole M Ippolito
*Assistant Examiner* — Hanway Chang
(74) *Attorney, Agent, or Firm* — Bayramoglu Law Offices LLC (57) ABSTRACT

A numerically controlled rotary probe switching device based on an environment-controllable atomic force microscope (AFM) includes a cavity upper cover and a probe switching structure. The cavity upper cover is provided with an irregular rectangular boss, an inner groove, a rectangular optical window structure and a sealing flange structure. The irregular rectangular boss is provided with the rectangular optical window structure; a front end of the boss is provided with the sealing flange structure; and a lower portion of the boss is provided with an inner groove for accommodating the probe switching structure and a transition groove for matching with a linear movement of a sample carrier and a rotary switching of probes. The probe switching structure is configured inside the inner groove, and the probe switching structure is provided with at least one probe assembly.

9 Claims, 8 Drawing Sheets

(56) References Cited

FOREIGN PATENT DOCUMENTS

| | | | |
|---|---|---|---|
| CN | 105181501 | A | 12/2015 |
| CN | 105891549 | A | 8/2016 |
| CN | 106918723 | A | 7/2017 |
| CN | 108427016 | A | 8/2018 |
| CN | 208367033 | U | 1/2019 |
| JP | 2006201132 | A | 8/2006 |

NUMERICALLY CONTROLLED ROTARY PROBE SWITCHING DEVICE BASED ON ENVIRONMENT-CONTROLLABLE ATOMIC FORCE MICROSCOPE

CROSS REFERENCE TO THE RELATED APPLICATIONS

This application is the national phase entry of International Application No. PCT/CN2019/071252, filed on Jan. 11, 2019, which is based upon and claims priority to Chinese Patent Application No. CN201810338397.3, filed on Apr. 16, 2018, and Chinese Patent Application No. CN201810637066.X, filed on Jun. 20, 2018, the entire contents of which are incorporated herein by reference.

TECHNICAL FIELD

The present invention belongs to the field of precision instruments, and particularly to a numerically controlled rotary probe switching device based on an environment-controllable atomic force microscope (AFM). The device is capable of carrying 8 probes, and realizing an efficient and precise switching of probes with different functions through a program control in different working environments such as a vacuum environment, an atmospheric environment, a liquid environment and a varying temperature environment. Therefore, in a same working environment, the functions of the device, i.e., a surface morphology scanning, a Raman spectral analysis, a microscopic friction and wear, and a measurement of friction coefficient, can be achieved within a same experimental area on a surface of a sample in situ.

BACKGROUND

The environment-controllable AFM is a precision instrument used to study the surface morphology and physico-chemical properties of materials including insulators, based on detecting a weak interaction between a tested sample and the probe, and selecting different working environments such as a vacuum environment, an atmospheric environment, a liquid environment and a varying temperature environment. The environment-controllable AFM, which has played an important role in the fields of surface interface science, materials science and life sciences and promoted the development of nanotechnology, is one of the key instruments for conducting micro-nano scale research. In recent years, with the rapid development of nanotechnology, the demand for environment-controllable AFM is increasing.

Currently, the environment-controllable AFMs can merely carry one probe with a single function. With the gradual deepening of the micro-nano scale research, in many studies, it is necessary to carry out various in-situ detection experiments within the same experimental area on the surface of the sample in a vacuum environment or a same atmospheric environment ((such as nitrogen, oxygen, humidity, alcohol vapor, etc.). For example, in the measurement of friction energy dissipation, other probes with different functions need to be replaced on the premise of not destroying the working environment to realize the in-situ detection. The friction energy dissipation measurement experiment in a vacuum environment is taken as an example. In the vacuum environment, firstly, a probe with a relatively small curvature radius (such as a silicon nitride probe) and a probe of a tip-enhanced Raman spectroscopy were used to perform a surface morphology scanning and a tip-enhanced Raman spectral analysis on an experimental area of a sample surface (the tip-enhanced Raman spectral analysis needs to be carried out with an integrated Raman optical system); secondly, a probe with a relatively large curvature radius (such as a silica pellet probe) was used to conduct microscopic friction and wear on the same experimental area of the sample surface, and a friction curve and other data were recorded; thirdly, the probe with the relatively small curvature radius and the probe of the tip-enhanced Raman spectroscopy were used to perform a surface morphology scanning and a tip-enhanced Raman spectral analysis on the same experimental area of the sample surface after the friction and wear. Based on the comprehensive analysis of all experimental results, the path and rules of friction energy dissipation are inferred, and the mechanism of friction energy dissipation is revealed. However, if the existing environment-controllable AFM is not modified to be equipped with a probe switching device, and the operation process of carrying one probe with a single function for one time is continued, the original working environment will be inevitably destroyed when the chamber is opened for the replacement of other probes with different functions, and many uncertain factors such as oxygen, water vapors and micro-particles in the air will be introduced, resulting in a pollution on the sample surface and a failure of obtaining reliable experimental data. Moreover, the above experimental process is complicated in operation and is inefficient, and after the probe is replaced, it is difficult to find the same experimental area having a nanometer scale to achieve the in-situ detection, which seriously hinders the in-depth study at the micro-nano scale.

However, it is extremely difficult to creatively provide a probe switching device based on an environment-controllable AFM, which is shown as follows:

1. At present, there is no probe switching device suitable for environment-controllable AFM in the scientific research community and industrial community. Only the probe holder and the support for probe holder of the ultra-high vacuum scanning probe microscope have a similar shape to that of the probe switching device. However, from the perspective of essence, the probe holder and the support for probe holder are completely different from the required probe switching device, and the specific details are as follows: (1) The probe holder and the support for probe holder are designed only for the ultra-high vacuum scanning probe microscope, for the functional aspect, the probe holder and the support for probe holder target the ultra-high vacuum environment, rather than the atmospheric environment, liquid environment, etc., required by the environment-controllable AFM. (2) The probe holder and the support for probe holder are very large in size, and unable to be directly transplanted into the environment-controllable AFM with an extremely limited internal space. (3) Since the ultra-high vacuum scanning probe microscope came out, there have been few improvements in the operation of the probe holder and the support for probe holder. The probe is replaced by manually moving the probe holder from the support for probe holder using an external operating lever. The operation is complicated and time-consuming, and it is impossible to quickly switch probes with different functions. (4) The number of positions in the support for probe holder where the probe holder can be placed are limited. The RHK ultra-high vacuum scanning probe microscope is taken as an example, the support for probe holder also serves as a support for sample holder for placing the probe holder and the sample holder at the same time. In order to ensure the smooth operation of the experiment, usually, about half of the positions are used to place the sample holder, and the remaining positions are used to place the probe holder. In addition, the probe holder and the support for probe holder are very expensive. To sum up, from the perspective of essence, the probe holder and the support for probe holder of the ultra-high vacuum scanning probe microscope are completely different from the required probe switching device, and difficult to provide useful reference and guidance.

2. According to the investigation, the design of the existing environment-controllable AFM (mainly the cavity upper cover thereof) focuses on installing one probe with a single function, and no redundant space is left for the modification of the probe switching device (AFM pertains to an ultra-precision instrument. In order to reduce system errors and improve detection accuracy, the mechanical, thermal and optical circuits are required to be designed as short as possible to avoid redundancy). As shown in FIGS. 13-17, the cavity upper cover, the optical window assembly and the probe assembly of the existing environment-controllable AFM are respectively named as original cavity upper cover Y1, original optical window assembly Y2 and original probe assembly Y3 in the present invention. The overall structure of original cavity upper cover Y1 is circular in shape, a circular window is provided in the middle of original cavity upper cover Y1, and original optical window assembly Y2 matched with the circular window is mounted on the upper end surface of original cavity upper cover Y1. Original optical window assembly Y2 is circular in shape, and is composed of circular optical window top cover Y2.3, circular light-transmitting plate Y2.2 and circular optical window hole Y2.1 superposed from top to bottom. Original optical window assembly Y2 is strictly matched with the concave space at the bottom of laser 13 in the diameter and height, without any redundancy. The concave space at the bottom of laser 13 is very limited, having a height of 8 mm, an area of 4239 mm$^2$, and a volume of 33912 mm$^3$. About a half of the concave space is used to install original optical window assembly Y2, while the remaining half of the concave space is used to install original probe assembly Y3 that can carry only one probe with a single function. This remaining half of the concave space can be used for the modification of the probe switching device. However, according to the investigation, currently, the available minimum piezoelectric miniature rotation stage has a volume of 6928 mm$^3$, and coupled with the installation space of the piezoelectric miniature rotation stage, original cavity upper cover Y1 cannot meet the modification requirements of the probe switching device in space. In addition, laser 13 is a key component of the AFM. Once the design of the AFM is finalized, the laser cannot be changed, so it is impossible to carry out the modification from the perspective of expanding the concave space at the bottom of laser 13. To sum up, the existing environment-controllable AFM (mainly the cavity upper cover thereof) has an extremely limited accommodation space, and can only carry one probe with a single function, so the existing environment-controllable AFM cannot be directly modified to be equipped with the probe switching device.

A Chinese patent applied by the present research group is as follows. A multi-probe friction and wear test and in-situ morphology detection system in vacuum (hereinafter referred to as "patent 1"), having an application number of CN 105181501 A, and a publication date of Dec. 23, 2015, includes a main body, and an external manual driving device capable of manually switching probes having different functions in a vacuum environment through a manual method. However, in practical applications, the patent inevitably has the following drawbacks:

1. For this device, the probes with different functions are manually and straightly switched by the external manual driving device. Due to the low precision of the external manual driving device, it is necessary to cooperate with the sample table back and forth when operating the external manual driving device, so as to achieve the positioning of the same experimental area at the nanometer scale. The whole operation is time-consuming, laborious and inefficient.

2. For this device, a very limited number of probes can be carried. According to the design, at most three probes can be carried. In experiments requiring more than three probes (for example, in the friction energy dissipation measurement experiment under the vacuum environment, in order to carry out the friction and wear test between two or more probes and samples, at least four probes are required in total), the device clearly fails to meet the experimental requirements.

In summary, there is an urgent need to creatively provide a probe switching device based on an environment-controllable AFM, which is capable of carrying at least four probes and realizing an efficient and precise switching of probes with different functions through a program control in different working environments such as a vacuum environment, an atmospheric environment, a liquid environment and a varying temperature environment. Therefore, in a same working environment, the functions of the device, i.e., a surface morphology scanning, a Raman spectral analysis, a microscopic friction and wear, and a measurement of friction coefficient, are realized within a same experimental area of a sample surface in situ.

SUMMARY

In order to overcome the above drawbacks in the prior art, the present invention proposes a new solution.

The technical problem to be solved by the present invention is as follows.

1. The existing environment-controllable AFM can only carry one probe with a single function. When the chamber is opened to replace other probes with different functions, the original working environment will be inevitably destroyed, and many uncertain factors will be introduced. For example, the introduction of oxygen, water vapors and micro-particles in the air will contaminate the surface of the sample, resulting in that the real and reliable experimental data cannot be obtained. Moreover, the above experimental process is complicated in operation and inefficient, and after the probe is replaced, it is difficult to find the same experimental area at the nanometer scale to achieve the in-situ detection, which seriously hinders the in-depth study at the micro-nano scale. However, at present, there is no probe switching device suitable for environment-controllable AFM in the scientific research community and industrial community. Moreover, the probe holder and the support for probe holder of the ultra-high vacuum scanning probe microscope are completely different from the required probe switching device, and difficult to provide useful reference and guidance.

2. The existing environment-controllable AFM (mainly the cavity upper cover thereof) has an extremely limited accommodation space, and can only carry one probe with a single function. So the existing environment-controllable AFM cannot be directly modified to be equipped with the probe switching device.

3. The patent 1 applied by the present research group, entitled "A multi-probe friction and wear test and in-situ morphology detection system in vacuum", discloses a device for manually and straightly switching probes with different functions by an external manual driving device. The device has low efficiency and low positioning precision. Moreover, the number of probes carried by this device are very limited. This device can only carry three probes at most, and fails to meet the requirements of experiments requiring more than three probes.

The technical solution proposed by the present invention is as follows. A numerically controlled rotary probe switching device based on an environment-controllable atomic force microscope (AFM) is provided, including a cavity upper cover, an optical window structure, a sealing flange structure and a probe switching structure. The cavity upper cover is provided with a boss, and the boss is provided with the optical window structure. A front end of the boss is provided with the sealing flange structure, and a lower portion of the boss is provided with an inner groove for accommodating the probe switching structure, and a transition groove for matching with a linear movement of the sample carrier and a rotary switching of a probe. The probe switching structure is configured inside the inner groove, and the probe switching structure is provided with at least one probe assembly.

Further, a shape of the boss is an irregular rectangle that strictly fits with a concave space at a bottom of a laser. For one aspect, the irregular rectangular boss is configured to provide sufficient space for processing the inner groove at the lower portion of the boss, thereby solving the problem of insufficient lower space of the traditional circular boss; and for another, the irregular rectangular boss is configured to reserve sufficient space for designing the sealing flange structure.

Further, a shape of the inner groove strictly fits with the probe switching structure. For one aspect, the inner groove is configured to significantly increase an internal working space of the cavity; and for another, the inner groove is configured to reduce a vertical distance between the laser and the probe to ensure a vertical focusing height of the laser.

Further, an overall shape of the optical window structure is rectangular, which is helpful for reducing a proportion of the optical window structure to an area of the boss and improving a space utilization rate. The optical window structure includes a rectangular optical window hole, a rectangular sealing gasket, a rectangular light-transmitting plate, and a rectangular optical window top cover. The rectangular sealing gasket and the rectangular light-transmitting plate are mounted on the rectangular optical window hole; and the rectangular light-transmitting plate is compressed tightly by the rectangular optical window top cover thereon. The rectangular sealing gasket is arranged between the rectangular light-transmitting plate and the rectangular optical window hole to ensure a high vacuum degree or a pure atmospheric environment inside the cavity.

Further, the cavity upper cover is provided with the sealing flange structure for mounting an external interface of a control circuit of a piezoelectric miniature rotation stage. For one aspect, the sealing flange structure is configured to prevent the external interface of the control circuit of the piezoelectric miniature rotation stage from occupying the internal working space of the cavity, thereby further improving the space utilization rate; and for another, the sealing flange structure is configured to ensure the high vacuum degree or the pure atmospheric environment inside the cavity.

Further, the external interface of the control circuit of the piezoelectric miniature rotation stage is a Lemo connector.

Further, the sealing flange structure includes a cavity upper cover sealing flange for placing a Lemo plug of the piezoelectric miniature rotation stage, and a Lemo connector sealing flange for ensuring a sealing at the Lemo connector. The cavity upper cover sealing flange is fixedly connected to the cavity upper cover by a sealing flange mounting threaded hole and a screw. Moreover, the cavity upper cover sealing flange and the cavity upper cover are sealed by an O-shaped sealing ring at a lower end interface of the cavity upper cover sealing flange. The Lemo connector sealing flange and the cavity upper cover sealing flange are hermetically connected by an internal thread of the cavity upper cover sealing flange and an external thread of the Lemo connector sealing flange, and are fixed by a sealing flange fixing nut.

Further, the probe switching structure includes a piezoelectric miniature rotation stage, a probe carrier block and a probe assembly. The probe assembly includes probe supports, a spring compressing piece, and probes. The probe carrier block is mounted on the piezoelectric miniature rotation stage; and the probe supports are mounted around the probe carrier block. Each probe support is mounted on a side surface around the probe carrier block through an L-shaped transition plate at a tail end of the probe support. Each probe carrier block is connected to the L-shaped transition plate at the tail end of the probe support through a screw and a probe carrier block eccentric blind hole around the side surface of the probe carrier block. The probes are mounted on the probe supports. The probe is compressed and fixed by the spring compressing piece pre-mounted on the probe support. The L-shaped transition plate is configured to further reduce the vertical distance between the laser and the probe to ensure the vertical focusing height of the laser.

Further, the probe carrier block carries 4 to 8 probes.

Further, the probe assembly deviates from a center line of the probe carrier block in the probe switching structure, and is located on a center line of the rectangular optical window hole, thus realizing a cooperation of the probe assembly with the laser spot in a horizontal direction to ensure a focusing position of the laser.

Further, in different working environments such as a vacuum environment, an atmospheric environment, a liquid environment or a variable temperature environment, the piezoelectric miniature rotation stage is digitally controlled by a program to drive a rotary switching of probes with different functions, and positioning a same experimental area at a nanometer scale efficiently and accurately. Therefore, in a same working environment, the functions of the device, i.e., a surface morphology scanning, a Raman spectral analysis, a microscopic friction and wear, and a measurement of friction coefficient, can be implemented in situ.

The present invention has the following advantages:

1. The internal working space of the cavity is significantly enlarged and the space utilization rate is effectively improved. (1) The shape of the boss of the cavity upper cover is optimally designed from the traditional circular to the irregular rectangle. For one aspect, the irregular rectangular boss provides sufficient space for processing the inner groove at the lower portion of the boss, thereby solving the problem of insufficient lower space of the traditional circular boss; and for another, the irregular rectangular boss reserves sufficient space for designing the sealing flange structure. The inner groove is provided at the lower portion of the boss; and the calculation of the 3D simulation software shows that the internal working space of the original cavity is 48553 cm$^3$, and the internal working space of the cavity is enlarged to 69034 cm$^3$ after the optimization design, which is increased by 42%. (2) The shape of the optical window structure of the boss is optimally designed from the traditional circular to the rectangular. In fact, the original circular optical window structure only has a small rectangular area used as a light-transmitting hole for the laser, which seriously wastes space. After the optical window structure is optimally designed into a rectangle, the proportion of the optical window area to the boss area is reduced under the premise of the same light-transmitting hole area, which effectively improves the space utilization rate. Generally, the environment-controllable AFM is designed to have a circular optical window structure. The circular optical window structure is simple and feasible in design and mature in technology, and the O-shaped sealing ring structure fitted with the circular optical window structure has a set of effective standards, and is very mature in technology after the development of the vacuum sealing industry for many years. While, the rectangular optical window structure is a unique structure provided by the present invention, and the sealing is achieved by a rectangular sealing gasket designed by the present invention. However, different from the traditional O-shaped sealing ring structure, this type of sealing lacks mature standards. The sealing design between the rectangular sealing gasket and the rectangular optical window is obtained based on rigorous calculation. Moreover, the side leakage instrument is used for test after the production and process, which proves that this sealing design can meet the usage requirements of a vacuum degree of $10^{-4}$ Pa or a pure atmospheric environment. (3) The size of the Lemo plug of the piezoelectric miniature rotation stage is large. In order to avoid the occupation of the internal working space of the cavity by the Lemo plug, the sealing flange structure is mounted on the cavity upper cover, and the Lemo plug is placed inside the sealing flange structure.

2. The vertical focusing height and focusing position of the laser are effectively guaranteed. (1) The piezoelectric miniature rotation stage has a certain thickness. If the piezoelectric miniature rotation stage is directly mounted inside the original cavity upper cover, it will exceed the vertical focusing height of the laser by 13 cm. In this case, the inner groove is provided at the lower portion of the boss of the cavity upper cover, and the connection is achieved by the L-shaped transition plate at the tail end of the probe support. These two designs can save the vertical height by 5 cm, so that the vertical distance between the laser and the probe still conforms to the laser vertical focusing height of 13 cm after mounting the piezoelectric miniature rotation stage. (2) The piezoelectric miniature rotation stage has an asymmetrical structure. If the probe support is directly mounted on the center line of the probe carrier block on the piezoelectric miniature rotation stage, the probe will deviate from the center line of the rectangular optical window structure (i.e., the rectangular optical window hole center line). For this reason, an asymmetric matching design is adopted. The probe support deviates from the probe carrier block center line, and is located on the center line of the rectangular optical window structure, thereby effectively ensuring the focusing position of the laser. At the same time, a transition groove is provided inside the cavity upper cover to fit a linear movement of the sample carrier and a rotary switching of a probe, and avoid collision between the sample carrier or the probe and the cavity upper cover during the movement. It should be noted that the maximum loading capacity of the AFM is only on a micro-Newton magnitude, and the asymmetric matching design does not affect the stability of the structure.

3. The probes with different functions can be switched efficiently and accurately. The switching of probes with different functions in the same working environment inside the cavity can be realized, thereby avoiding the introduction of many uncertain factors, such as oxygen, water vapors and micro-particles in the air, preventing the contamination of the surface of the sample, and obtaining real and reliable experimental data. The whole experiment process is simple and convenient. At the same time, the rotary switching of probes with different functions is realized by the driving of the piezoelectric miniature rotation stage with high precision, and the same experimental area at the nanometer scale is efficiently and accurately positioned. Meanwhile, a variety of probe carrier blocks are designed. Different types of probe carrier blocks can carry different numbers of probes, and at least 4 probes and at most 8 probes can be carried. In order to ensure independent and stable operation of each probe, the thread depth of the probe carrier block eccentric blind hole configured for mounting the probe support should be no less than 1.5 mm. Moreover, the thread of the probe carrier block eccentric blind hole cannot interfere with other structures of the probe carrier block; and the size of the sample is considered. The simulation calculations show that according to the present invention, the probe carrier block can only carry 8 probe supports at most, i.e., carry 8 probes. By changing the probe carrier blocks, the purpose of carrying different number of probes can be achieved. In summary, in the same working environment inside the cavity, the efficient and precise switching of probes with different functions is achieved.

4. The in-situ friction energy dissipation measurement is realized. In the same working environment inside the cavity, the probes with different functions, such as the surface morphology scanning probe, Raman spectral analysis probe, microscopic friction and wear probe, and friction coefficient measuring probe, are switched; and the friction energy dissipation information such as heat generation, emission and structural evolution is obtained by combining with other in-situ detection methods. Therefore, the path and rules of the friction energy dissipation are inferred, and the mechanism of the friction energy dissipation is revealed.

In the drawings, cavity upper cover (1), boss (1.1), rectangular optical window hole (1.2), rectangular optical window hole center line (1.3), laser positioning block (1.4), sealing flange through-hole (1.5), sealing flange mounting threaded hole (1.6), cavity upper cover mounting through-hole (1.7), inner groove (1.8), transition groove (1.9), rectangular sealing gasket (2), rectangular light-transmitting plate (3), rectangular optical window top cover (4), cavity upper cover sealing flange (5), sealing ring groove (5.1), cavity upper cover sealing flange internal thread (5.2), O-shaped sealing (6), Lemo connector sealing flange (7), Lemo connector (7.1), Lemo connector sealing flange external thread (7.2), sealing flange fixing nut (7.3), piezoelectric miniature rotation stage (8), probe carrier block (9), probe carrier block eccentric blind hole (9.1), probe carrier block center line (9.2), probe support (10), L-shaped transition plate (10.1), spring compressing piece (11), probe (12), laser (13), vacuum chamber (14), sample carrier (15), sample carrier support (16), original cavity upper cover (Y1), original optical window assembly (Y2), circular optical window hole (Y2.1), circular light-transmitting plate (Y2.2), circular optical window top cover (Y2.3), the original probe assembly (Y3).

DETAILED DESCRIPTION OF THE EMBODIMENTS

At present, there is no probe switching device suitable for environment-controllable AFM in the scientific research community and industrial community. Moreover, the probe holder and the support for probe holder of the ultra-high vacuum scanning probe microscope are completely different from the required probe switching device, and difficult to provide useful reference and guidance. The patent 1 applied by the present research group, entitled "A multi-probe friction and wear test and in-situ morphology detection system in vacuum", discloses a device for manually and straightly switching probes with different functions by an external manual driving device, and the device has low efficiency and low positioning precision. Moreover, the number of probes carried by this device are very limited. This device can only carry three probes at most, which fails to meet the requirements of experiments. In view of this, the present invention cannot obtain reference and guidance from the ultra-high vacuum scanning probe microscope and the patent 1 on how to break through the existing challenging problems such as "the existing environment-controllable AFM (mainly the cavity upper cover thereof) has an extremely limited accommodation space", "how to realize the efficient and precise switching of four or more probes with different functions", etc. Instead, the present invention can only find a novel path and creatively provide a numerically controlled rotary probe switching device based on an environment-controllable AFM.

The present invention will be further described with reference to the drawings.

As shown in FIGS. 1-8 and FIG. 11, a numerically controlled rotary probe switching device based on an environment-controllable atomic force microscope (AFM) is provided. A function improvement is mainly performed on cavity upper cover 1 of the environment-controllable AFM, so that a novel numerically controlled rotary probe switching device is designed. The numerically controlled rotary probe switching device includes cavity upper cover 1 and a probe switching structure. Cavity upper cover 1 is provided with a sealing flange structure for mounting an external interface of a control circuit of piezoelectric miniature rotation stage 8, boss 1.1 for matching with laser, and laser positioning block 1.4. The boss 1.1 is provided with a rectangular optical window structure. A lower portion of boss 1.1 is provided with inner groove 1.8 for accommodating the probe switching structure, and transition groove 1.9 for matching with a linear movement of sample carrier 15 and a rotary switching of probe 12. The probe switching structure is configured inside inner groove 1.8, and the probe switching structure is provided with a required number of probe assemblies.

An external interface of a control circuit of piezoelectric miniature rotation stage 8 is Lemo connector 7.1.

As shown in FIGS. 1-8, the sealing flange structure includes cavity upper cover sealing flange 5 and Lemo connector sealing flange 7. Between cavity upper cover 1 and Lemo connector 7.1, cavity upper cover sealing flange 5 for placing a Lemo plug of piezoelectric miniature rotation stage 8 and Lemo connector sealing flange 7 for ensuring a sealing at the Lemo connector are arranged.

Cavity upper cover 1 is provided with sealing flange through-hole 1.5 and sealing flange mounting threaded hole 1.6 for matching with a lower end interface of cavity upper cover sealing flange 5. Cavity upper cover 1 is fixedly connected to cavity upper cover sealing flange 5 by sealing flange mounting threaded hole 1.6 and screws. The lower end interface of cavity upper cover sealing flange 5 is provided with sealing ring groove 5.1. O-shaped sealing ring 6 is provided inside sealing ring groove 5.1 for ensuring the sealing performance of the whole sealing flange structure.

Lemo connector sealing flange 7 and the cavity upper cover sealing flange 5 are connected hermetically by the sealing of cavity upper cover sealing flange internal thread 5.2 and Lemo connector sealing flange external thread 7.2, and are fixed by sealing flange fixing nut 7.3, for ensuring a vacuum degree of $10^{-4}$ Pa or a pure atmospheric environment inside the cavity.

Figure 1:
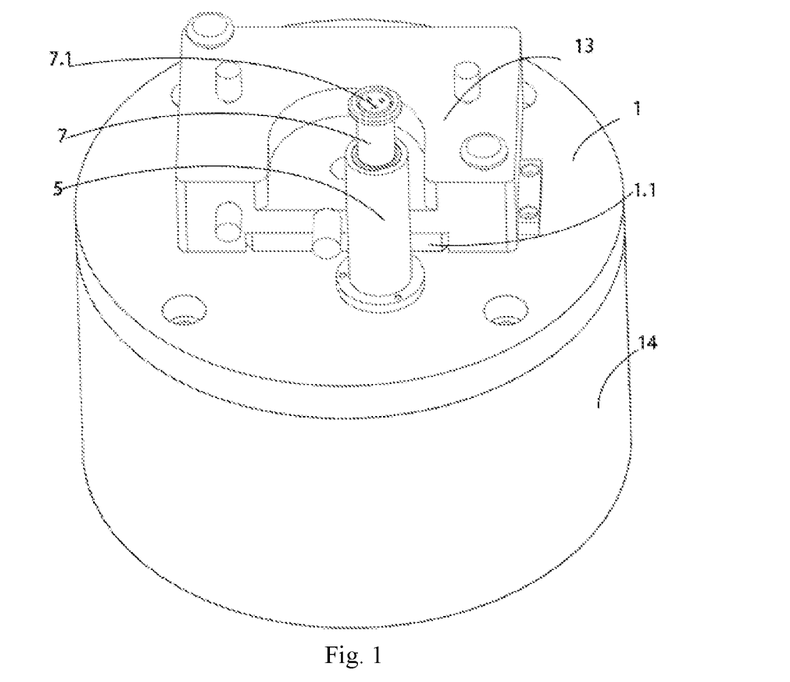
FIG. 1 is a structural schematic diagram of a use state from one view according to an embodiment of the present invention (wherein, laser 13 and vacuum chamber 14 do not belong to the present invention)
Figure 2:
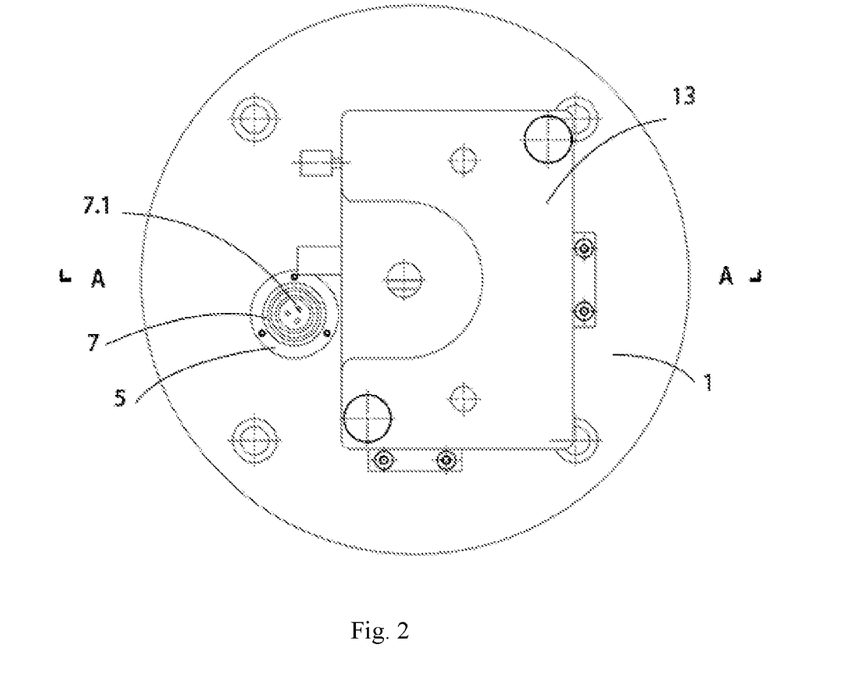
FIG. 2 is a top view of a use state according to an embodiment of the present invention (wherein, laser 13 and vacuum chamber 14 do not belong to the present invention)
Figure 3:
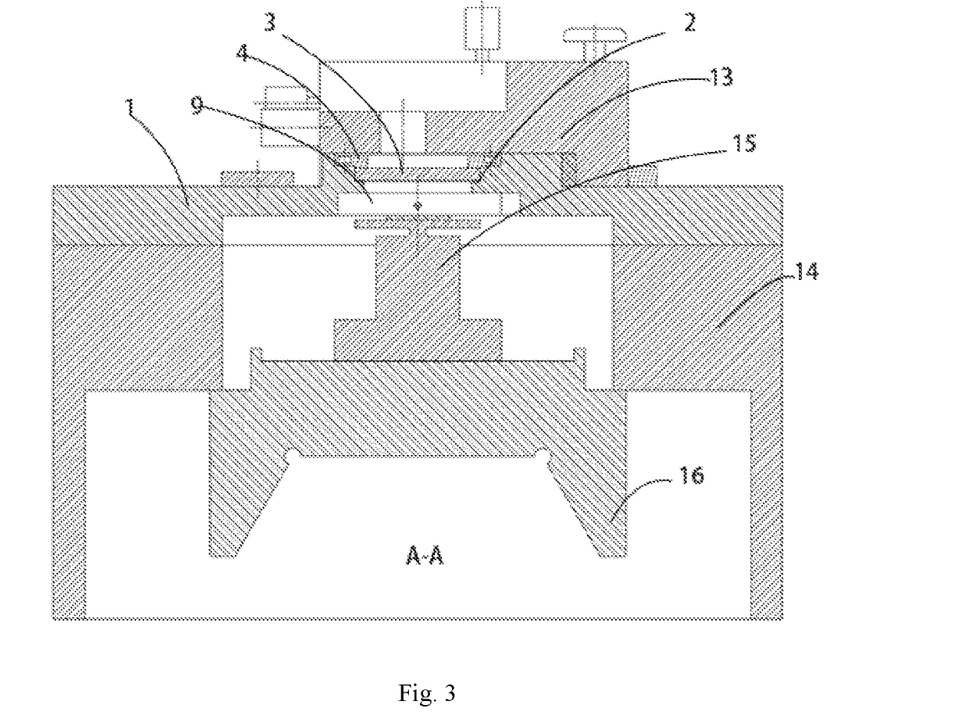
FIG. 3 is a cross-sectional view along an A-A direction in FIG. 2.
Figure 4:
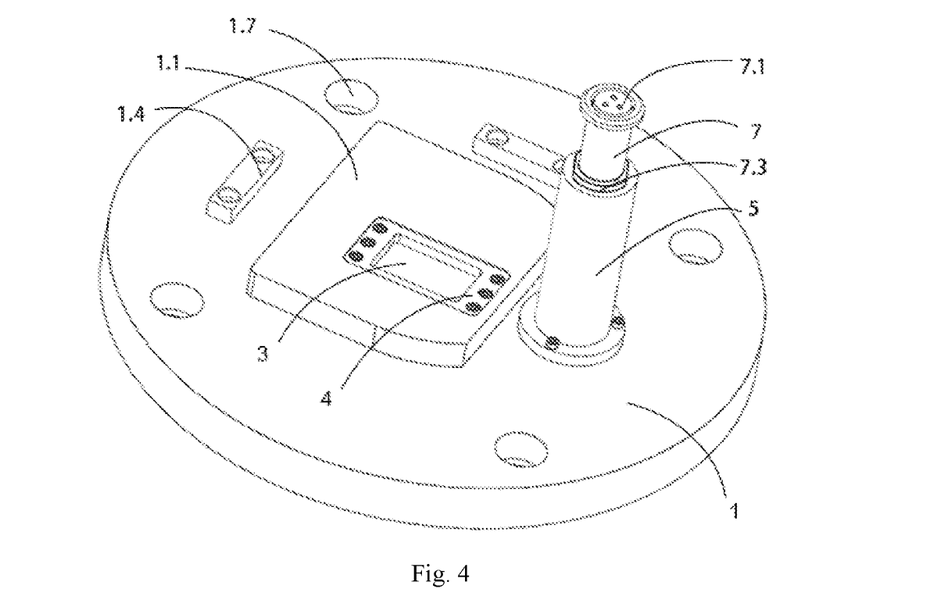
FIG. 4 is a structural schematic diagram of an embodiment of the present invention from another view.
Figure 5:
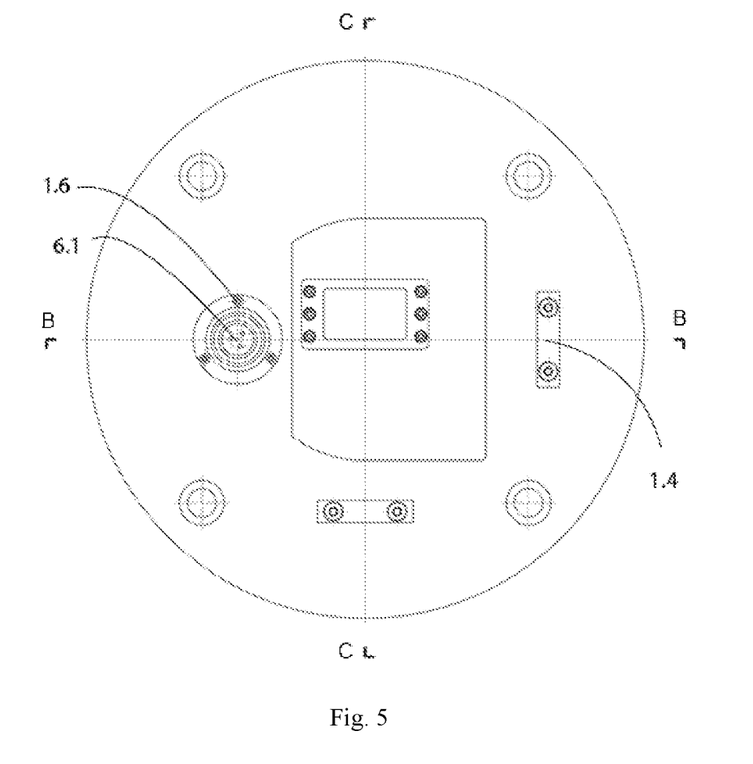
FIG. 5 is a top view of an embodiment of the present invention.
Figure 6:
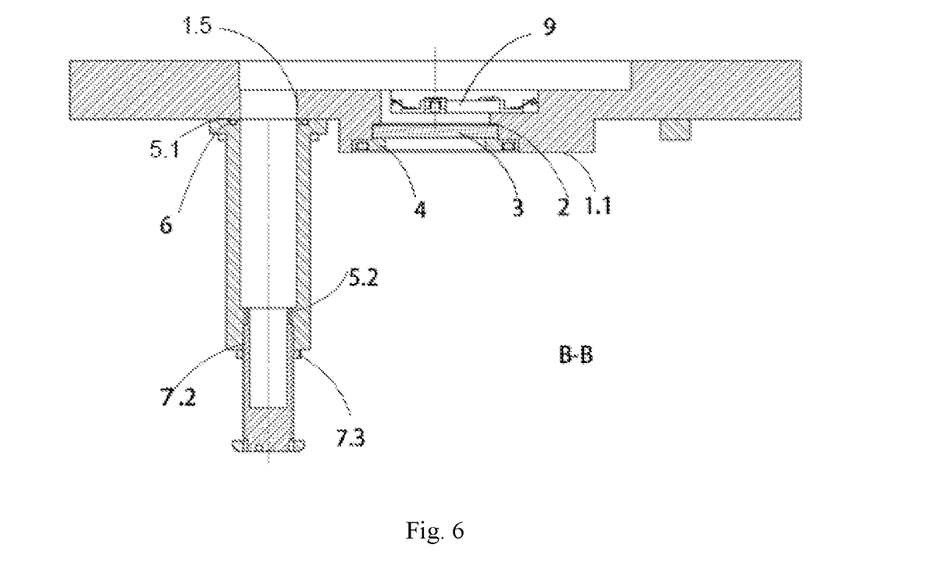
FIG. 6 is a cross-sectional view along a B-B direction in FIG. 5.
Figure 11:
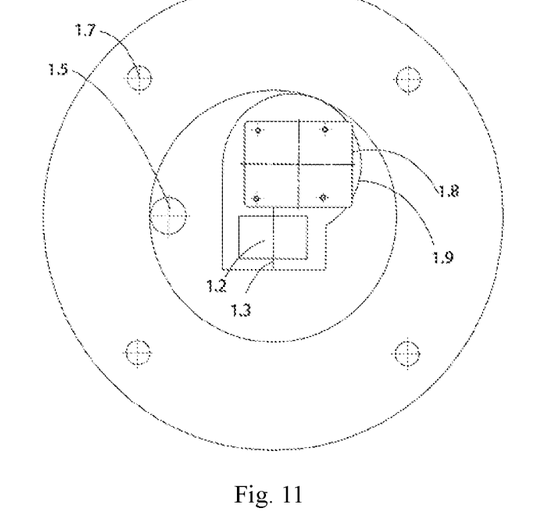
FIG. 11 is a structural schematic diagram of cavity upper cover 1 from one view.
Figure 12:
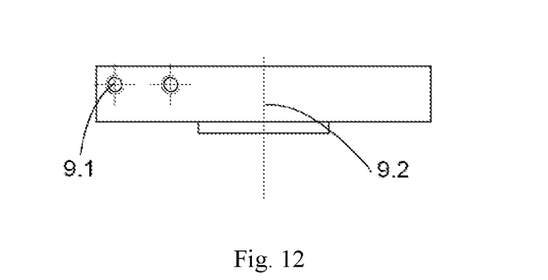
FIG. 12 is a front view of probe carrier block 9.
Figure 13:
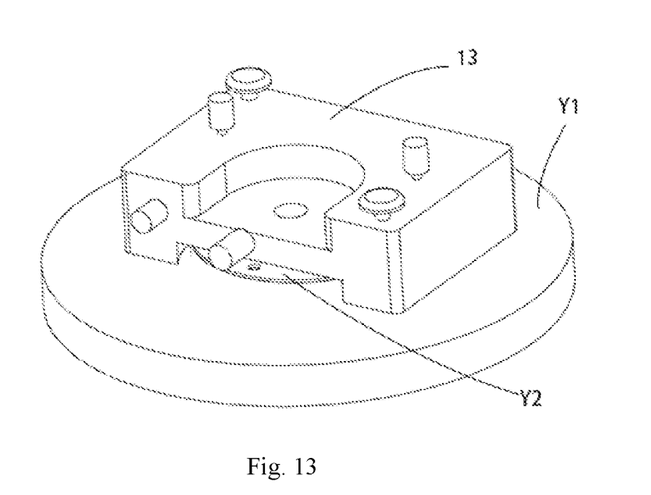
FIG. 13 is a structural schematic diagram of a use state of original cavity upper cover Y1 and original optical window assembly Y2 (a cavity upper cover and an optical window assembly of an existing environment-controllable AFM) from one view.
Figure 14:
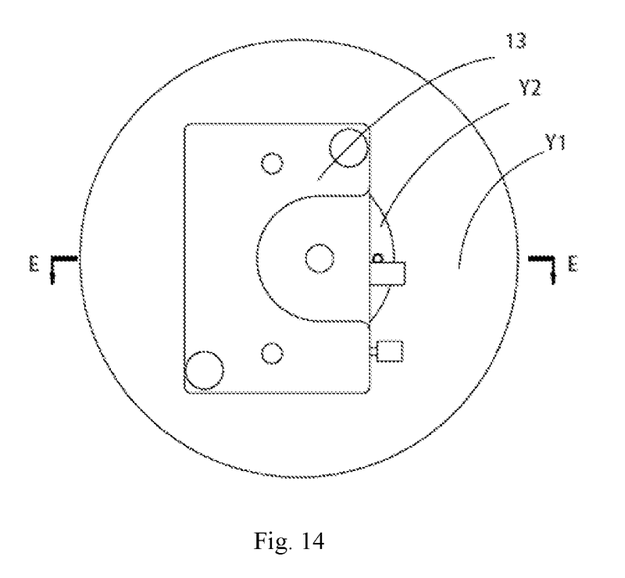
FIG. 14 is a top view showing of a use state of a structure of original cavity upper cover Y1 and original optical window assembly Y2.
Figure 15:
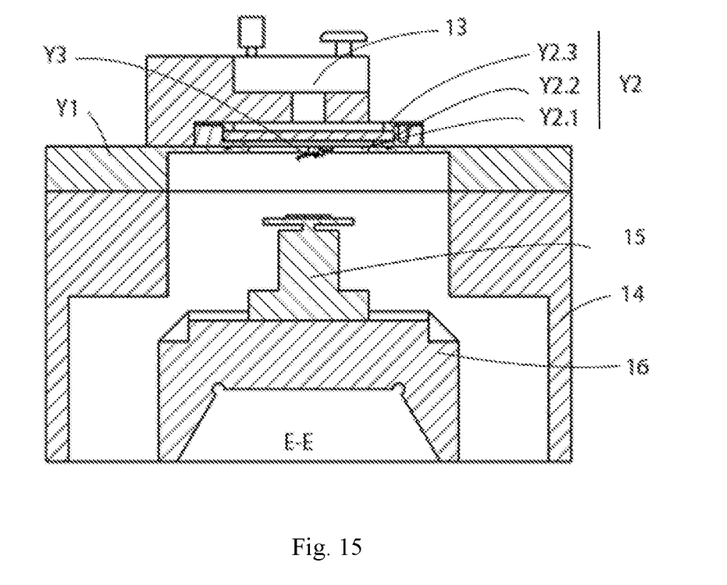
FIG. 15 is a cross-sectional view along an E-E direction in FIG. 14.
Figure 16:
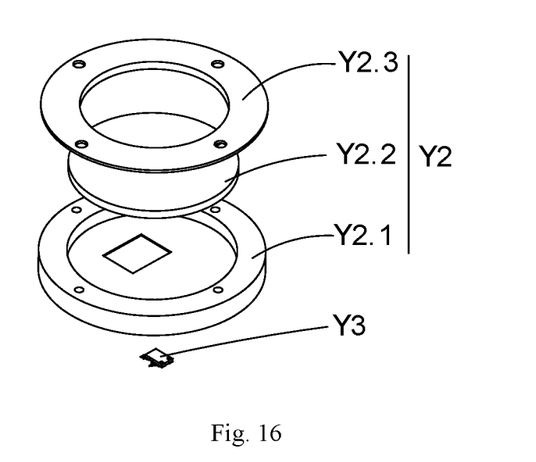
FIG. 16 is an exploded view showing a structure of original optical window assembly Y2.
Figure 17:
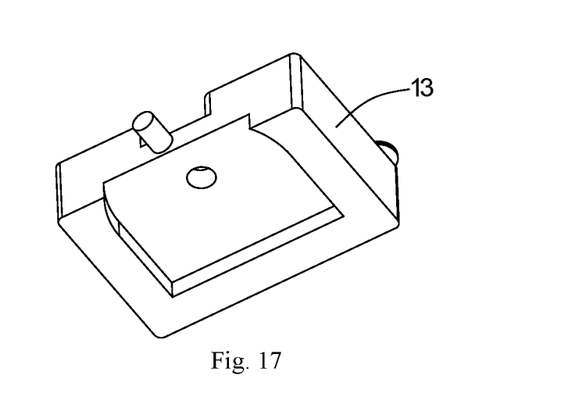
FIG. 17 is a structural schematic diagram of laser 13 from one view, showing that a concave space at a bottom of laser is extremely limited.

As shown in FIGS. 4, 6 and 11, the rectangular optical window structure includes rectangular optical window hole 1.2 on cavity upper cover 1, rectangular sealing gasket 2, rectangular light-transmitting plate 3 and rectangular optical window top cover 4. Rectangular sealing gasket 2 and rectangular light-transmitting plate 3 are mounted on rectangular optical window hole 1.2; and rectangular light-transmitting plate 3 is compressed tightly by rectangular optical window top cover 4 thereon. Rectangular sealing gasket 2 is arranged between rectangular light-transmitting plate 3 and rectangular optical window hole 1.2, thereby ensuring the vacuum degree of $10^{-4}$ Pa or the pure atmospheric environment inside the cavity.

Figure 9:
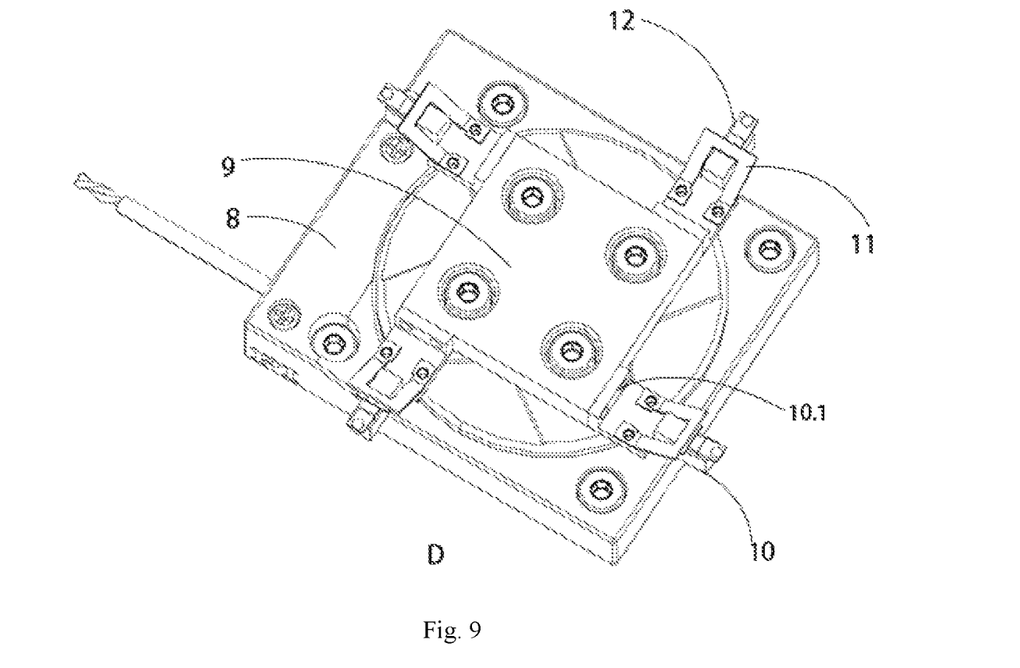
FIG. 9 is a partial enlarged view of the part D in FIG. 8 (4 probes are carried)
Figure 10:
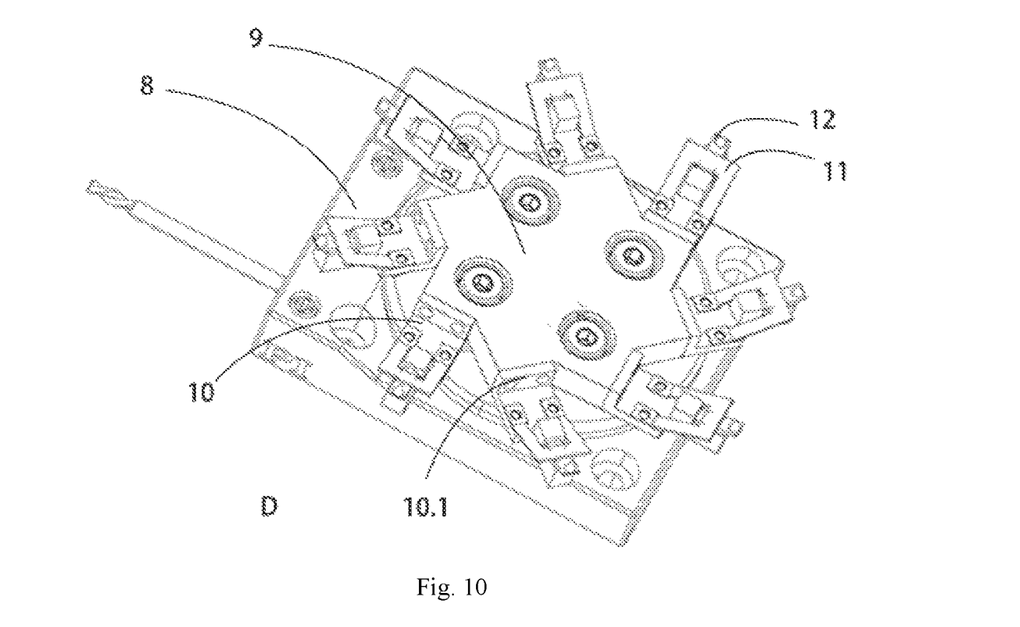
FIG. 10 is a partial enlarged view of the part D in FIG. 8 (8 probes are carried)

As shown in FIGS. 9 and 10, the probe switching structure includes three parts: piezoelectric miniature rotation stage 8, probe carrier block 9 and a probe assembly. Probe carrier block 9 is fixedly connected to an upper end surface of piezoelectric miniature rotation stage 8 by screws. The probe assembly includes probe support 10, spring compressing piece 11 and probe 12. Probe 12 is mounted on probe support 10, and is compressed and fixed by spring compressing piece 11.

Compared with FIG. 9, the purpose of carrying different numbers of probes is achieved by changing different probe carrier blocks 9. For example, if probe carrier block 9 shown in FIG. 10 is replaced, 8 probes with different functions can be carried at the same time.

In order to ensure the requirement of vertical focusing height of laser, one of the improvements is that L-shaped transition plate 10.1 is added to the probe assembly, and probe carrier block 9 and probe support 10 are connected by L-shaped transition plate 10.1. One end of spring compressing piece 11 is fixedly connected to probe support 10 by screws, and the other end tightly compresses probe 12. Probe 12 is compressed and fixed on probe support 10 by a spring force of spring compressing piece 11.

Piezoelectric miniature rotation stage 8 drives probe carrier block 9 to rotate. A plurality of probe supports 10 are mounted on probe carrier block 9 for rotary switching of probes with different functions.

As shown in FIGS. 8-10 and FIG. 12, probe support 10 is eccentrically mounted on probe carrier block 9. Probe carrier block 9 is connected to probe support 10 through probe carrier block eccentric blind hole 9.1 and the screws, so that probe support 10 after being mounted deviates from probe carrier block center line 9.2, and is located on rectangular optical window hole center line 1.3, thereby effectively ensuring a cooperation of the laser spot and probe 12 in a horizontal direction.

Transition groove 1.9 is provided inside the cavity upper cover to match with a linear movement of sample carrier 15 and a rotary switching of probe 12 and avoid collision between sample carrier 15 or probe 12 and cavity upper cover 1 during the movement.

Figure 7:
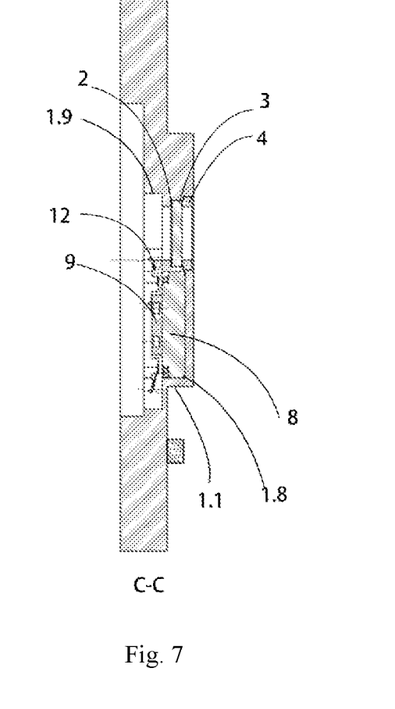
FIG. 7 is a cross-sectional view along a C-C direction in FIG. 5.
Figure 8:
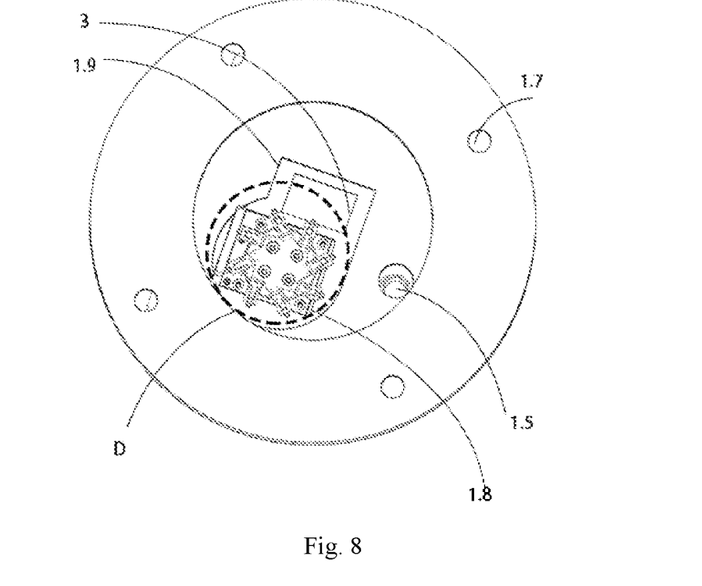
FIG. 8 is a structural schematic diagram of an embodiment of the present invention from one view.

As shown in FIGS. 6-8, a shape of inner groove 1.8 is fitted with that of piezoelectric miniature rotation stage 8. Piezoelectric miniature rotation stage 8 is fixed inside inner groove 1.8 by screws.

Cavity upper cover 1 is provided with cavity upper cover mounting through-hole 1.7. Cavity upper cover 1 is fixedly connected to vacuum chamber 14 through cavity upper cover mounting through-hole 1.7 and bolts.

Cavity upper cover 1 is provided with laser positioning block 1.4. Laser positioning block 1.4 is configured to implement a horizontal positioning of laser 13.

As shown in FIGS. 8-10, a mounting method of the probe switching structure is as follows. Piezoelectric miniature rotation stage 8 is mounted on inner groove 1.8 by screws. Probe carrier block 9 is mounted on piezoelectric miniature rotation stage 8 by screws. Probe supports 10 are mounted around probe carrier block 9, and each probe carrier block 9 is connected to L-shaped transition plate 10.1 at a tail end of probe support 10 through probe carrier block eccentric blind hole 9.1 and screws. Probe 12 is mounted on probe support 10, and is compressed and fixed by spring compressing piece 11. Spring compressing piece 11 is pre-mounted on probe support 10 by screws.

According to the present invention, irregular rectangular boss 1.1 matched with laser 13 is mounted on cavity upper cover 1, a rectangular optical window structure is designed, and inner groove 1.8 is provided at the lower portion of boss 1.1, thereby significantly increasing the internal working space of the cavity, and facilitating the mounting of the probe switching structure. The rectangular optical window structure is adopted, including rectangular optical window hole 1.2, rectangular sealing gasket 2, rectangular light-transmitting plate 3 and rectangular optical window top cover 4, which effectively improves the space utilization rate, and reduces the proportion of the optical window structure to the boss area. Sealing flange through-hole 1.5 and sealing flange mounting threaded hole 1.6 are processed on cavity upper cover 1; cavity upper cover sealing flange 5 is aligned with sealing flange through-hole 1.5; and cavity upper cover sealing flange 5 is mounted on cavity upper cover 1 through sealing flange mounting threaded hole 1.6 and screw. Subsequently, Lemo connector sealing flange 7 mounted with Lemo connector 7.1 is connected to cavity upper cover sealing flange 5 by screws, and is fixed by sealing flange fixing nut 7.3. Therefore, the problem that the Lemo plug cannot be placed inside the cavity is effectively solved.

According to the present invention, inner groove 1.8 is processed inside cavity upper cover 1 for mounting piezoelectric miniature rotation stage 8. Then probe carrier block 9 is mounted on piezoelectric miniature rotation stage 8, and screws are passed through L-shaped transition plate 10.1 at a tail end of probe support 10 to screw into probe carrier block eccentric blind hole 9.1, thereby connecting probe support 10 and probe carrier block 9 together. The two innovative designs of inner groove 1.8 and L-shaped transition plate 10.1 greatly reduce the vertical height and effectively ensure the vertical focusing height of the laser.

According to a numerically controlled rotary probe switching device based on an environment-controllable AFM of the present invention, the switching of probes 12 with different functions in the same working environment inside the cavity can be realized, thereby avoiding the introduction of many uncertain factors, such as oxygen, water vapors and micro-particles in the air, preventing the contamination of the surface of the sample, and obtaining real and reliable experimental data. The whole experiment process is simple and convenient. At the same time, the rotary switching of probes 12 with different functions is realized by the driving of piezoelectric miniature rotation stage 8 with high precision controlled by an external digital controller, and the same experimental area at the nanometer scale is efficiently and accurately positioned. Meanwhile, a variety of probe carrier blocks 9 are designed. Different types of probe carrier blocks 9 can carry different numbers of probes 12, at least 4 probes and at most 8 probes can be carried. The purpose of carrying different number of probes 12 is achieved by changing probe carrier blocks 9. The carried multiple probes 12 can be of different types or the same type (the multiple probes are used to implement different functions to verify the repeatability and stability of the previous experiment). In order to ensure independent and stable operation of each probe 12, the thread depth of probe carrier block eccentric blind hole 9.1 on probe carrier block 9, which is configured for mounting probe support 10, should be no less than 1.5 mm. Moreover, a thread of probe carrier block eccentric blind hole 9.1 cannot interfere with other structures of probe carrier block 9; and the size of the sample is considered. The simulation calculation shows that according to the present invention, probe carrier block 9 can only be mounted with eight probe supports 10, i.e., carry eight probes 12.

The main structure of the present invention is made of 304 stainless steel. The 304 stainless steel has excellent corrosion resistance, intergranular corrosion resistance and high temperature resistance, which effectively ensures the corrosion resistance of the probe switching device in different working environments. The interface of the rectangular optical window structure is provided with rectangular gasket 2, and the interface of the sealing flange structure is provided with O-shaped sealing ring 6, which effectively ensures the sealing performance of the probe switching device.

According to the present invention, piezoelectric miniature rotation stage 8 with high precision is precisely controlled by an external digital controller, to drive probes 12 with different functions, such as surface morphology scanning probe 12, Raman spectral analysis probe 12, microscopic friction and wear probe 12, and friction coefficient measuring probe 12, to be rotary switched in the same working environment inside the cavity. Moreover, the friction energy dissipation information such as heat generation, emission and structural evolution is obtained by combining with other in-situ detection methods. Therefore, the path and rules of friction energy dissipation are inferred, and the mechanism of friction energy dissipation is revealed.

The installation and working process of the probe switching device of the present invention are as follows. Probes 12 having different functions, such as surface morphology scanning probe 12, Raman spectral analysis probe 12, microscopic friction and wear probe 12, and friction coefficient measuring probe 12, are mounted on probe support 10. The sample is placed. The entire probe switching device is mounted and fixed on vacuum chamber 14 by bolts. Lemo connector 7.1 on the probe switching device is connected to the external digital controller. Through the control by a program, probes 12 with different functions are sequentially positioned to the same experimental area on the surface of the sample for detection. The friction energy dissipation measurement experiment in vacuum environment is taken as an example. In the vacuum environment, firstly, surface morphology scanning probe 12 and Raman spectral analysis probe 12 are sequentially positioned on an experimental area on the surface of the sample to carry out experiments to obtain microscopic morphology and Raman spectroscopy; subsequently, microscopic friction and wear probe 12 and friction coefficient measuring probe 12 are sequentially positioned at the same experimental area on the surface of the sample by program control, and the friction curve and other data are obtained; finally, surface morphology scanning probe 12 and Raman spectral analysis probe 12 are sequentially positioned at the same experimental area on the surface of the sample by program control, and the microscopic morphology and Raman spectrum after friction and wear are obtained. Based on the comprehensive analysis of all experimental results, the path and rules of friction energy dissipation are inferred, and the mechanism of friction energy dissipation is revealed. The whole operation process is completed in the same working environment by program control. A variety of detection methods work together in succession, which is efficient and accurate. It not only saves the experiment time and experiment cost, but more importantly, ensures the authenticity and reliability of the experimental results.

The present invention can be applied to other related research fields, such as life sciences.

Those of ordinary skill in the art will recognize that the embodiments described herein are intended to assist the reader in understanding the principles of the present invention. It should be understood that the protective scope of the present invention is not limited by such particular descriptions and embodiments. According to the technical enlightenment disclosed by the present invention, various other specific modifications and combinations may be made by those of ordinary skill in the art without departing from the essence of the present invention, and all the modifications and combinations shall fall within the protective scope of the present invention.

What is claimed is:

1. A numerically controlled rotary probe switching device based on an environment-controllable atomic force microscope (AFM), comprising: a cavity upper cover, an optical window structure, a sealing flange structure, and a probe switching structure; wherein
   the cavity upper cover is provided with a boss;
   the boss is provided with the optical window structure, a front end of the boss is provided with the sealing flange structure, and a lower portion of the boss is provided with an inner groove for accommodating the probe switching structure and a transition groove for matching with a linear movement of a sample carrier and a rotary switching of probes;
   the probe switching structure is configured inside the inner groove, and the probe switching structure is provided with at least one probe assembly;
   the cavity upper cover provided with the sealing flange structure for mounting an external interface of a control circuit of a piezoelectric miniature rotation stage; the sealing flange structure is configured to avoid an occupation of an internal working space of a cavity by the external interface of the control circuit of the piezoelectric miniature rotation stage, thereby improving a space utilization rate; and the sealing flange structure is configured to ensure a high vacuum degree or a pure atmospheric environment inside the cavity;
   the sealing flange structure comprises a cavity upper cover sealing flange for placing a Lemo plug of the piezoelectric miniature rotation stage and a Lemo connector sealing flange for ensuring a sealing at the Lemo connector; the cavity upper cover sealing flange is fixedly connected to the cavity upper cover by a sealing flange mounting threaded hole and screws, and the cavity upper cover is sealed by an O-shaped sealing ring at a lower end interface of the cavity upper cover sealing flange; the Lemo connector sealing flange and the cavity upper cover sealing flange are connected hermetically by a cavity upper cover sealing flange internal thread and a Lemo connector sealing flange external thread, and are fixed by a sealing flange fixing nut.

2. The numerically controlled rotary probe switching device based on the environment-controllable AFM according to claim 1, wherein a shape of the boss is an irregular rectangle strictly fitting with a concave space at a bottom of a laser; the irregular rectangular boss is configured to provide sufficient space for processing the inner groove at the lower portion of the boss, thereby solving a problem of insufficient lower space of a traditional circular boss; and the irregular rectangular boss is configured to reserve a sufficient space for designing the sealing flange structure.

3. The numerically controlled rotary probe switching device based on the environment-controllable AFM according to claim 1, wherein a shape of the inner groove is strictly fitted with the probe switching structure; the inner groove is configured to significantly increase an internal working space of a cavity; and the inner groove is configured to reduce a vertical distance between a laser and the probes to ensure a vertical focusing height of the laser.

4. The numerically controlled rotary probe switching device based on the environment-controllable AFM according to claim 1, wherein an overall shape of the optical window structure is rectangular, and is designed for reducing a proportion of the optical window structure to an area of the boss and improving a space utilization rate; the optical window structure comprises a rectangular optical window hole, a rectangular sealing gasket, a rectangular light-transmitting plate, and a rectangular optical window top cover; the rectangular sealing gasket and the rectangular light-transmitting plate are mounted on the rectangular optical window hole; and the rectangular light-transmitting plate is compressed tightly by the rectangular optical window top cover on the rectangular light-transmitting plate; and the rectangular sealing gasket is arranged between the rectangular light-transmitting plate and the rectangular optical window hole to ensure a high vacuum degree or a pure atmospheric environment inside the cavity.

5. The numerically controlled rotary probe switching device based on the environment-controllable AFM according to claim 1, wherein the external interface of the control circuit of the piezoelectric miniature rotation stage is a Lemo connector.

6. The numerically controlled rotary probe switching device based on the environment-controllable AFM according to claim 1, wherein the probe switching structure comprises a piezoelectric miniature rotation stage, a probe carrier block, and a probe assembly; the probe assembly comprises a probe support, a spring pressing piece, and the probes; the probe carrier block is mounted on the piezoelectric miniature rotation stage; and the probe supports are mounted around the probe carrier block; the probe support is mounted on a side surface around the probe carrier block through an L-shaped transition plate at a tail end of the probe support; the probe carrier block is connected to the L-shaped transition plate at the tail end of the probe support through a probe carrier block eccentric blind hole around the side surface of the probe carrier block and screws; the probes are mounted on the probe support, and the probes are compressed and fixed by a spring compressing piece pre-mounted on the probe support; and the L-shaped transition plate is configured to further reduce a vertical distance between a laser and the probes to ensure a vertical focusing height of the laser.

7. The numerically controlled rotary probe switching device based on the environment-controllable AFM according to claim 6, wherein the probe carrier block carries 4 to 8 probes.

8. The numerically controlled rotary probe switching device based on the environment-controllable AFM according to claim 1, wherein the probe assembly deviates from a probe carrier block center line in the probe switching structure, the probe assembly is located on a rectangular optical window hole center line, and cooperates with a laser spot in a horizontal direction to ensure a focusing position of a laser.

9. The numerically controlled rotary probe switching device based on the environment-controllable AFM according to claim 1, wherein in different working environments including a vacuum environment, an atmospheric environment, a liquid environment and a variable temperature environment, a piezoelectric miniature rotation stage is digitally controlled by a program to drive a rotary switching of probes with different functions, position a same experimental area at a nanometer scale efficiently and accurately, and in-situ implement functions of the numerically controlled rotary probe switching device including a surface morphology scanning, a Raman spectral analysis, a microscopic friction and wear, and a measurement of friction coefficient in a same working environment.

* * * * *